Patented Dec. 25, 1951

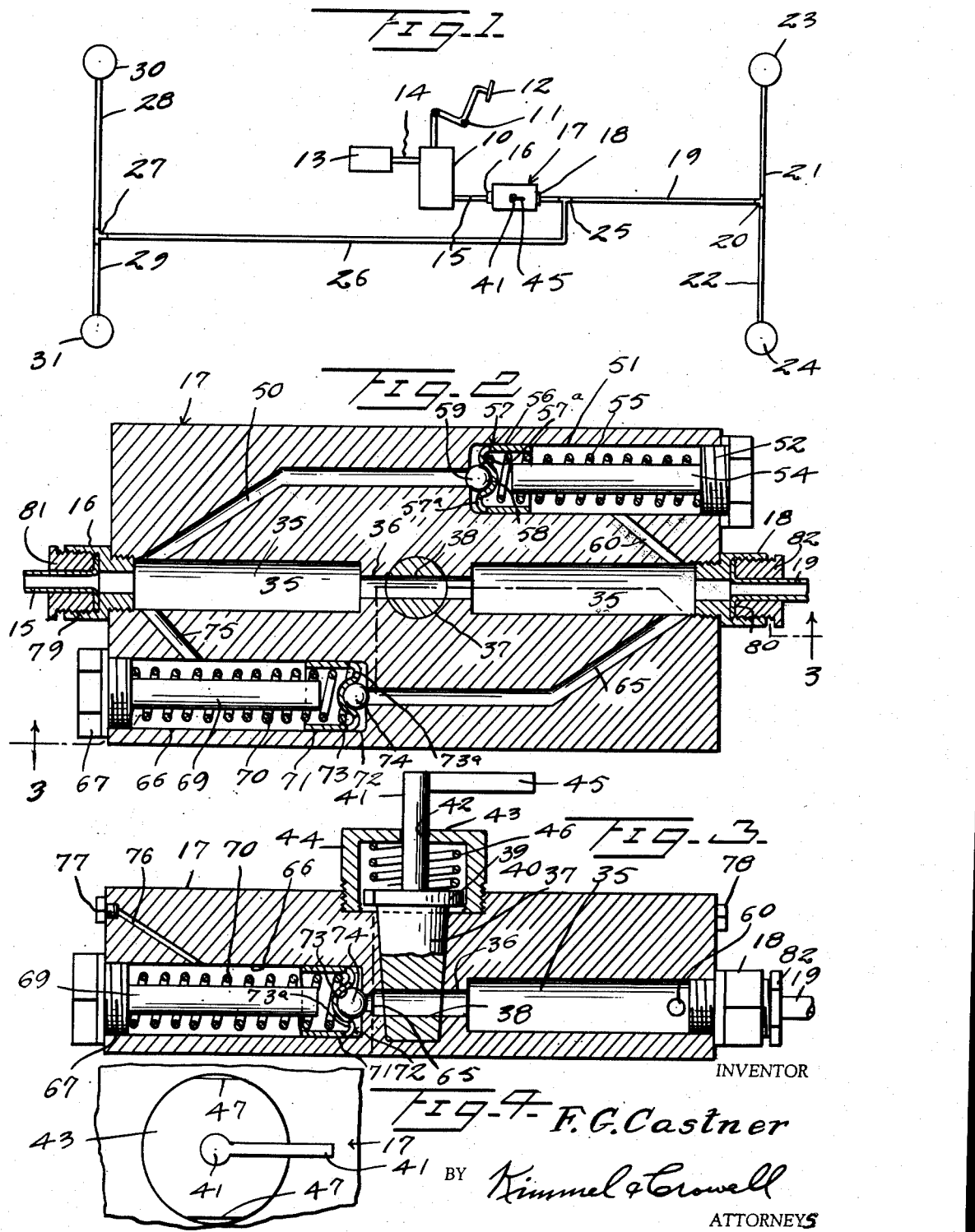

2,579,904

UNITED STATES PATENT OFFICE 2,579,904

PRESSURE REGULATING VALVE FOR HYDRAULIC BRAKE SYSTEMS

Frank G. Castner, Bridgeport, Ohio, assignor to The Tirips Corporation, Steubenville, Ohio Application April 27, 1950, Serial No. 158,490

1 Claim. (Cl. 188—152)

This invention relates to a pressure regulating valve for hydraulic brake systems, more particularly as applied to motor vehicles, and has as its primary object the provision of a valve device to permit the continuous application of pressure to hydraulic brakes without leakage thereof to permit the use of a hydraulic brake system as a parking brake.

A further object is the provision of pressure controlled outlet means whereby excessive pressure in the individual brake cylinders or feed lines is precluded, to prevent damage to the brake system.

Still another object of this invention is the provision of manually operable means whereby the valve structure may be rendered operative or inoperative for locking the brakes.

A more specific object resides in the provision of an improved valve housing and valve structure therein for accomplishing the foregoing objects.

Other objects will in part be obvious and in part be pointed out as the description of the invention proceeds and as shown in the accompanying drawing wherein:

Figure 1 is a schematic view of a hydraulic brake system showing the positioning of the valve structure relative thereto, Figure 2 is a longitudinal vertical sectional view taken substantially along the center line of the valve housing, Figure 3 is a sectional view taken substantially along the line 3—3 of Figure 2 as viewed in the direction indicated by the arrows, and Figure 4 is an enlarged fragmentary plan view of a constructional detail.

Similar reference characters refer to similar parts throughout the several views of the drawing.

Referring now to the drawing in detail and particularly to Figure 1 there is shown at 10 the master cylinder of a hydraulic brake system containing the customary piston (not shown) and actuated through a suitable conventional leverage system 11 by a brake pedal 12. Cylinder 10 is supplied with hydraulic fluid from a reservoir 13 through a connection 14. From the cylinder 10 an inlet line 15 leads to an inlet 16 comprising an element of a valve housing 17 which forms a part of the instant invention as will be more fully pointed out hereinafter, and from the outlet 18 of housing 17 a line 19 extends to a junction 20 from which lines 21 and 22 lead to individual wheel brake cylinders 23 and 24 respectively, of conventional type. A take off 25 from line 19 communicates with a line 26 which extends to a junction 27 from which lines 28 and 29 extend to additional individual brake cylinders 30 and 31 respectively for the other wheels of the vehicle.

Referring now to valve housing 17 in detail, it will be seen that as best shown in Figures 2 and 3 the housing is provided with a main fluid passage 35 extending longitudinally thereof from inlet 16 to outlet 18, provided with a centrally positioned restricted portion 36. Intersecting restricted portion 36 at its midpoint is a frustroconical bore adapted for the accommodation of a correspondingly shaped main valve member 37 rotatable in friction tight relation therein and having a bore 38 of a diameter equal to restricted portion 36 therethrough. Valve 37 is provided with an enlarged head 39 adapted to engage a gasket 40 seated in the bottom of a threaded cylindrical recess in the top of housing 17. A valve stem 41 extends upwardly from the head 39 through an aperture 42 in the top 43 of a threaded cup shaped locking or sealing nut 44, and terminates in an operating handle 45. A compression spring 46 is positioned between head 39 and the inner side of the top 43 of nut 44 to hold valve member 37 securely in its associated bore. As best shown in Figure 4, nut 44 is provided with opposed flats 47 to accommodate a wrench when it is desired to remove the nut and the valve for cleaning or the like.

Extending from the inlet side of main passage 35 is a channel 50, which communicates with an open ended bore 51 closed by a threaded plug 52 having a spring guiding interiorly positioned axial stem 54. Positioned about stem 54 and having one end seated against plug 52 is a coil spring 55, the other end of which is seated within the flange 56 of a cup shaped member 57 preferably perforated as at 57a although, alternatively, grooves (not shown) may extend longitudinally of the periphery of cup 57 to permit passage of fluid thereby. The face of member 57 is provided with a concavity 58 for the snug reception and retention of a ball valve 59 which is adapted to be biased by spring 55 to close the opening of channel 50 into bore 51. Spring 55 is adapted to yield to a desired fluid pressure in passage 50, for example, to a pressure of 60 lbs., to admit hydraulic pressure to bore 51, when the desired pressure in the inlet side of main passage 35 and channel 50 is achieved, when valve 37 is closed. A channel 60 extends from bore 51 to main passage 35 on the outlet side of valve 37 whereby fluid may be by-passed above valve 37 to outlet 18 and thence through lines 19 and 26 to the individual brake cylinders 23, 24, 30 and 31.

Means are provided for relieving the pressure in the individual wheel cylinders and lines leading thereto when excessive pressure is created therein, valve 37 being closed, and take the form of an escape passage 65 extending into an open ended bore 66 identical but opposite to bore 51 closed by a plug 67 having a spring guiding stem 69 projecting axially into bore 66, the latter being surrounded by a spring 70 having one end seated against the inner end of plug 67 and the other end within the skirt 71 or flange of a cup-shaped member 72 identical to member 57, and concaved as at 73 snugly to accommodate and retain a ball check valve 74, normally closing the junction of channel 65 and bore 66, member 72 being perforated at 73a in a manner similar to the previously discussed perforations in member 57.

The spring 70 is materially stronger than spring 55 and adapted to yield to open valve 74 at a higher pressure, as for example, 90 lbs.

A return channel 75 extends from bore 66 to the inlet side of main passage 35 adjacent inlet 16.

A bleed and filling channel 76 closed by a threaded plug 77 communicates with bore 66 and a similar channel (not shown) closed by a plug 78 communicates with bore 51. Inlet 16 and outlet 18 both comprise interiorly threaded cup shaped members, and the flared inner ends 79 and 80 of lines 15 and 19 respectively are secured therein by means of externally threaded reducing nuts 81 and 82 respectively.

From the foregoing, the method of use of the device is readily understandable. In normal operation the valve 37 is open, passage 38 being in alignment with restricted portion 36 of main passage 35, and upon application of pressure to brake pedal 12 hydraulic fluid passes directly through main passage 35 to the individual brake cylinders to apply braking pressure in the conventional manner.

When, however, it is desired to use the hydraulic system as a parking brake, valve 37 is closed by means of handle 45, which is so positioned as to be readily accessible to the operator of the vehicle, and pedal 12 pumped one or more times to increase the fluid pressure to a point, illustratively to 60 lbs., to open valve 59. Fluid thus passed to the individual brake cylinders will be retained by check valve 59 and closed main valve 37 after pressure on the brake pedal is released. The pressure may thus be built up to a desired point to retain the brakes in locked position. Over application of pressure sufficient to damage the system, as for example, in excess of 90 lbs., is precluded by check valve 74, which, when the pressure exceeds the selected point and brake pedal 12 is released, will open to permit fluid to flow back into main passage 35 on the inlet side of valve 37. It will be understood that in conventional hydraulic brake systems, fluid pressure from the master cylinder is released and the fluid flows back to the master cylinder from the brake cylinders when the brake pedal is fully released. Through the use of the oppositely disposed check valves 59 and 74 which are under differential spring pressure, the pressure on the brakes is constantly maintained between the selected limits regardless of the number of times the brake pedal is pumped and any over-pressure is promptly reduced upon complete release of the brake pedal.

Obviously when it is desired to release the brakes it is merely necessary to open valve 37 by means of handle 45 whereupon the fluid under pressure will flow back through line 15, cylinder 10 and line 14 to reservoir 13.

As many embodiments may be made in this inventive concept and as many modifications may be made in the embodiment herein shown and described, and it is to be understood that all matter herein is to be interpreted merely as illustrative and not in a limiting sense.

What is claimed is:

In combination with a hydraulic brake system, including a master cylinder, a pedal for operating said cylinder, and passageways extending from said cylinder to each wheel, a valve device for the selective maintenance of a predetermined pressure in said passageways whereby said system may be used to maintain brake pressure when the vehicle is parked, said device comprising a housing, a centrally positioned main fluid passage therethrough, said passage including an enlarged portion having an inlet and a second opposite enlarged portion having an outlet and a reduced diameter portion connecting said enlarged portion, a frusto-conical bore open at one end intersecting said reduced diameter portion, a frusto-conical valve having a passage of a diameter corresponding to that of said reduced diameter portion therethrough rotatably seated in said bore, a valve stem on said valve, said housing having an internally threaded recess surrounding the open end of said bore, an externally threaded closure cap having a top provided with a centrally positioned opening therein engaging in said recess, a valve operating stem extending from said valve through said opening, an external operating handle in said stem, a compression spring seated between said top of said cap and the top of said valve biasing said valve inwardly in said bore, a by-pass channel extending from said first enlarged portion adjacent said inlet toward said second enlarged portion, a tubular bore communicating at one end with the end of said channel and having its other end open, a closure for said open end, a spring guiding stem secured to said closure extending into said tubular bore, a cup-shaped member having a centrally positioned concavity in its face adjacent said one end of said tubular bore, said cup having apertures therein about the periphery of said concavity, a ball valve of a greater diameter than said by-pass channel seated in said concavity, a first ball valve biasing spring positioned between said cup and said closure normally biasing said ball valve to channel closing position, an additional by-pass channel communicating an intermediate portion of the wall of said tubular bore with said second enlarged portion of said main fluid passage adjacent said outlet, a second by-pass channel extending from said second enlarged portion adjacent said outlet toward said first enlarged portion, a second tubular bore oppositely disposed relative to said first tubular bore communicating at one end with the end of said second inlet by-pass channel and having its other end open, a second closure for said last-mentioned open end, a spring guiding stem secured to said second closure extending into said second bore, a second cup-shaped member having a centrally positioned concavity in its face adjacent said one end of said second tubular bore, said second cup having apertures therein about the periphery of said concavity, a ball valve of greater diameter than said second by-pass channel seated in said second concavity, a second ball valve biasing spring positioned between said second cup and said second closure normally biasing said second ball valve to channel closing position, and a second additional by-pass channel connecting an intermediate portion of said second tubular bore with said first enlarged portion of said main fluid passage adjacent said inlet, said second ball valve biasing spring being substantially stronger than said first ball valve biasing spring.

FRANK G. CASTNER.

REFERENCES CITED

The following references are of record in the file of this patent:

UNITED STATES PATENTS

| Number | Name | Date |
|---|---|---|
| 1,087,945 | Huff | Feb. 24, 1914 |
| 1,577,446 | Brown | Mar. 23, 1926 |
| 1,756,056 | Dorward | Apr. 29, 1930 |
| 1,888,392 | Penick | Nov. 22, 1932 |
| 1,923,127 | Veenschoten | Aug. 22, 1933 |
| 2,181,699 | Leichsenring | Nov. 28, 1939 |
| 2,271,031 | Parker | Jan. 27, 1942 |
| 2,285,781 | Patrick | June 9, 1942 |